Aug. 25, 1964     R. K. HATHAWAY     3,146,194
FILTER
Filed Oct. 25, 1961
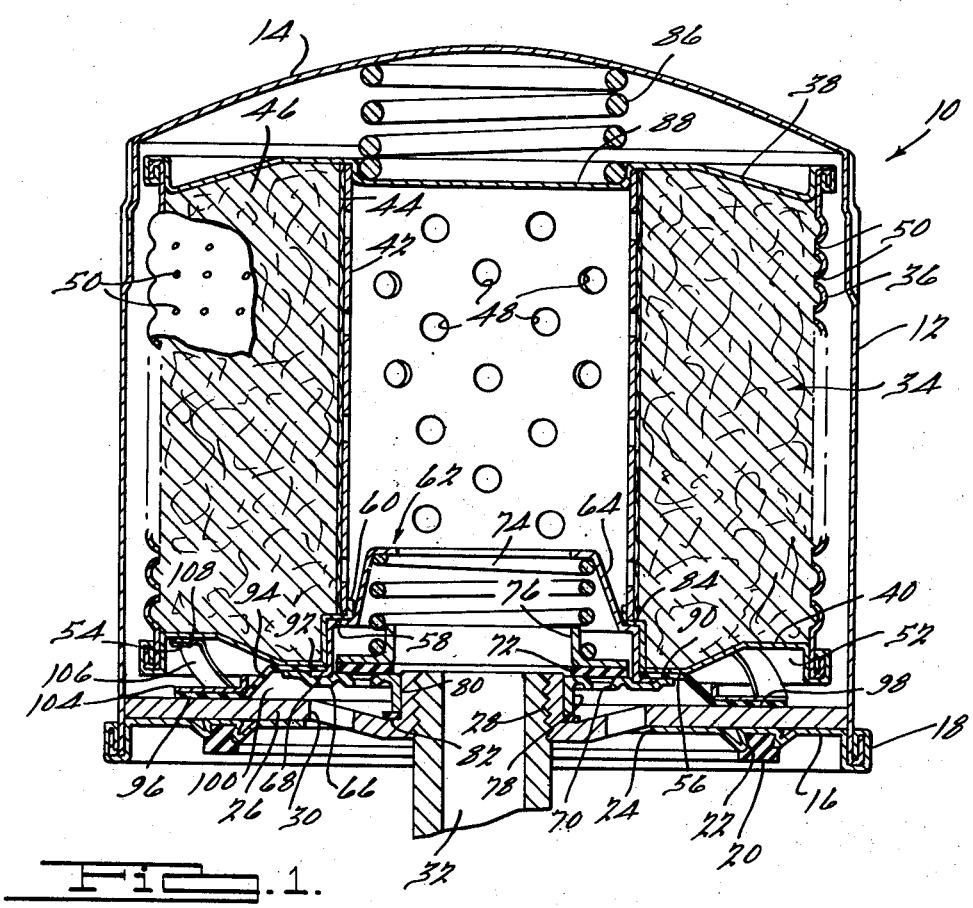
INVENTOR.
Robert K. Hathaway
BY
Harness, Dickey & Pierce
ATTORNEYS.

United States Patent Office 3,146,194
Patented Aug. 25, 1964

3,146,194
FILTER
Robert K. Hathaway, Racine, Wis., assignor to Walker Manufacturing Company, Racine, Wis., a corporation of Delaware
Filed Oct. 25, 1961, Ser. No. 147,552
1 Claim. (Cl. 210—130)

This invention relates to fluid filters and in particular to oil filters which are adapted to receive oil from the oil pump of automotive engines and the like, filter the same and pass the filtered oil back out into the lubricating system of the engine or other structure.

The present filter provides a housing containing a filter element, a pressure relief valve, and an anti-drainback valve which are so constructed and assembled that the filter may be made sufficiently cheaply to be used as a disposable filter.

Heretofore the provision within a filter housing of a filter element, relief valve and an anti-drainback valve has necessitated the use of separate seals to provide the anti-drainback feature and to seal the outlet of the filter element to the outlet of the filter housing. Moreover, the particular anti-drainback valves employed were of such structure that they resulted in a rather tortuous flow path for bypassing the oil through the relief valve mechanism. It is noted that the relief valve is normally employed to allow excessively viscous oil to bypass the filter element during cold engine operating conditions such as at starting, and also when the filter element for some reason becomes clogged and unable to properly filter the required amount of oil. In such instances it is desirable to provide the shortest and least tortuous path for bypassing the element so that the lubricating system of the engine will not be deprived of proper lubrication. It is further noted that it is desirable to provide the bypass flow path in such a way that the oil will not have to come in contact with sediment or dirty oil drippings which may be contained in the housing adjacent to the filter element and particularly in the lower portions of the housing wherein the force of gravity may tend to cause this sediment to collect.

The main objects of the invention therefore are to provide a filter with a relief valve and an anti-drainback valve wherein both valves may be sealed in the housing by a single sealing element; to provide a filter having a relief valve and an anti-drainback valve so positioned in the filter housing that a non-tortuous bypass flow path is provided which does not contact lower peripheral portions of the housing wherein sediment may be collected; to provide a filter element and a filter relief valve of such construction that an anti-drainback valve disc may be readily clamped therebetween by the force of single spring means urging the filter element toward the inlet end of the housing; to provide an end of a filter element of such a shape that it may form a spring-receiving recess in conjunction with the base plate of the filter; and to provide a spring which may be formed in a single stamping and forming operation and which is of such reduced height and strength that it may be used to resiliently urge an anti-drainback sealing disc against the base plate of the filter with sufficient force around the entire sealing portion of the disc to provide positive anti-drainback sealing while allowing the anti-drainback seal to be readily lifted from its sealing position by the incoming oil.

Further objects, advantages and novel features of the invention will become apparent from the following description taken in conjunction with the drawing wherein:

FIGURE 1 is a longitudinal sectional view of the filter; and

FIG. 2 is an isometric view of the anti-drainback valve spring.

In the drawings:

The filter 10 comprises a housing having a main portion 12, an outer end 14 and an inner end 16. End 16 is locked as at 18 by roll seaming to the portion 12 and is provided with a rubber or other gasket material sealing ring 20 locked thereto by the crimped channel 22, and is further provided with a centrally located aperture 24. A base plate 26 is positioned on end 16 of the housing and is provided with an inwardly extending threaded portion 28 and a plurality of inlet ports 30. Portion 28 receives a pipe 32 connected to the lubricating system of a vehicle engine or the like and the seal 20 is tightly clamped against a portion of the vehicle engine as the pipe 32 is threaded into the portion 28 to provide sealed oil inlet passage means leading from the oil pump to the inlet ports 30.

A filter element 34 is contained in the housing and comprises a shell wall 36, an outer end cap 38, an inner end cap 40 and a center tube 42. A cloth sleeve or the like 44 may be provided around the tube 42 to prevent the fibrous filtering material 46 from migrating through the apertures 48 in the center tube. The shell wall 36 of the element is provided with a plurality of oil ports 50. The inner cap 40 of the element is formed to provide an annular recess 52, an annular outer surface 54, an annular inner shoulder 56, an annular abutment 58 and an upstanding annular flange 60. The purpose of these various portions is described in detail below.

A pressure relief valve 62 is provided with a housing which comprises a cup-shaped shell 64 and a cap 66. The cap is secured preferably by spot welding to the rim 68 of the shell at circumferentially spaced portions of the rim. Cap 66 is provided with a plurality of circumferentially spaced relief ports 70 which are normally sealed closed by a rubber sealing disc 72 urged against the cap 66 by a spring 74 and an annular pressure member 76. It is noted that the bypass flow path is direct from the inlet ports 30 through the relief ports 70 and out through the filter outlet 32 and requires no flow of the oil into contact with portions of the filter element. A downwardly extending flange 78 is formed on the cap 66 to provide an aperture 80 for receiving the portion 28 of the base plate and engages a sealing ring 82. An annular inner abutment 84 is formed in the shell 64 of the relief valve and engages the annular abutment 58 formed on the inner cap 40 of the filter element. The annular flange 60 of the cap nests inside of the end of the center tube 42 to properly position it with respect to the cap 40. A spring 86 is provided at the top of the housing intermediate the end 14 thereof and a recessed portion 88 in the outer cap 38 and is compressed during the assembly of the filter housing portions 12 and 16 to securely hold the relief valve, filter housing and the base plate together to prevent rattling and dislocation thereof.

The outer flange 90 of the relief valve cap and the top of rim 68 of the relief valve housing forms an annular shoulder means which in cooperation with the annular shoulder 56 on the inner cap 40 of the element clamps and frictionally secures the annular inner portion 92 of a flexible sealing disc 94 to positively seal the relief valve against the filter element. Disc 94 is formed with an outer annular sealing portion 96 which is adapted to seal against the upper surface 98 of the base plate 26. In order to insure that portion 96 is allowed to be properly sealed against the surface 98 when oil pressure is reduced or lost in the oil inlet chamber 100 such as during engine shut-down periods or oil pump break down, an anti-drainback valve spring 102 is positioned in the annular recess 52 and is provided with a ring-shaped body portion 104 seated on top of the sealing portion 96 of the disc and is resiliently urged by the resilient fingers 106 toward portion 96. As shown in FIGURE 2, the fingers 106 of the spring are formed up from the body 104 and are provided at their outer ends with sliding bearing surfaces 108 which are adapted to slide against the surface 54 of the inner cap 40 when the oil pressure in chamber 100 causes portion 96 of the disc to lift from its seat 98. The spring is provided with an upstanding rim 110 which provides rigidity to the body 104 and prevents any buckling thereof which might allow a leak past the sealing portion 96 when it is supposed to be seated.

It is readily apparent that the above-described structure allows the filter element, relief valve, subassembly 62 (comprising cap 66 spotwelded to retainer 64 with spring 74, disc 76 and rubber valve 72 inside), sealing disc 94, spring 102, base plate 26 and spring 86 to be assembled merely by dropping them into position in the upturned housing 12 and thereafter locked therein by roll seaming the end cap 16 of the housing to the housing portion 12. These structural features allow the filter to be so economically produced that it may readily be used as a disposable filter.

While it will be apparent that the embodiments of the invention herein disclosed are well calculated to fulfill the objects of the invention, it will be appreciated that the invention is susceptible to modification, variation and change without departing from the proper scope or fair meaning of the subjoined claim.

What is claimed is:

A filter assembly comprising, a filter housing having one end provided with a centrally located fluid outlet and a fluid inlet spaced radially outwardly from said outlet, a filter cartridge in said housing being substantially coaxial with said outlet, a fluid by-pass valve assembly in said housing located adjacent said one end of said housing and providing for by-pass flow of fluid from said inlet to said outlet, said by-pass valve assembly including a valve shell in which is formed an annular shoulder for supporting said filter cartridge in position axially spaced from said one end of said housing, said valve assembly including an annular by-pass valve and valve spring each of which is concentric with said fluid outlet, said valve assembly further including a by-pass flow opening located radially inwardly from said annular shoulder and which is normally closed by said by-pass valve, an annular resilient disk having inner and outer peripheral portions and being concentric with said valve shell, said inner peripheral portion being rigidly clamped between said annular shoulder and said filter cartridge and acting as a fluid seal between said filter cartridge and said by-pass valve assembly, said outer peripheral portion bearing against said one end of said filter housing and at least partially defining a fluid inlet chamber with which both said fluid inlet and said by-pass flow opening are communicable, and spring means resiliently maintaining said outer peripheral portion of said disk against said one end of said housing radially outward from said fluid inlet such that said outer peripheral portion acts as a check valve to prevent back flow through said inlet.

References Cited in the file of this patent
UNITED STATES PATENTS

| | | |
|---|---|---|
| 890,121 | Brenner et al. | June 9, 1908 |
| 2,108,798 | Dalrymple | Feb. 22, 1938 |
| 2,174,743 | Groeniger | Oct. 3, 1939 |
| 2,996,155 | Priesemuth | Aug. 15, 1961 |
| 3,036,711 | Wilhelm | May 29, 1962 |
| 3,042,215 | Gruner | July 3, 1962 |
| 3,061,101 | Humbert | Oct. 30, 1962 |